US011955305B1

(12) United States Patent
Snyder

(10) Patent No.: US 11,955,305 B1
(45) Date of Patent: Apr. 9, 2024

(54) REMOTE CONTROL HOLDER

(71) Applicant: Cliff C. Snyder, Weatherford, TX (US)

(72) Inventor: Cliff C. Snyder, Weatherford, TX (US)

( * ) Notice: Subject to any disclaimer, the term of this patent is extended or adjusted under 35 U.S.C. 154(b) by 299 days.

(21) Appl. No.: 17/367,736

(22) Filed: Jul. 6, 2021

Related U.S. Application Data

(60) Provisional application No. 63/048,008, filed on Jul. 3, 2020.

(51) Int. Cl.
*H01H 9/02* (2006.01)

(52) U.S. Cl.
CPC .................................... *H01H 9/025* (2013.01)

(58) Field of Classification Search
CPC .... H01H 9/025; H01H 9/0235; H01H 9/0242; F16M 11/041; F16M 13/00; H04N 21/42206; H04N 21/42204
See application file for complete search history.

(56) References Cited

U.S. PATENT DOCUMENTS 4,709,412 A * 11/1987 Seymour ................ H04B 1/202 455/352
4,712,693 A * 12/1987 Striplin .................. F16M 13/00 211/26.1
4,739,887 A * 4/1988 Beach .................... A47B 81/06 211/26.1
4,739,897 A * 4/1988 Butler .................. F16M 11/041 206/320
4,838,505 A * 6/1989 Lowe ..................... H01H 9/025 248/176.1
4,852,746 A * 8/1989 Wells ................... F16M 11/041 211/26.1
4,856,658 A * 8/1989 Novak .................. F16M 11/22 211/26.1
4,991,892 A * 2/1991 Burrell ................... F16M 13/00 211/26.1
5,042,670 A * 8/1991 Timberlake .......... A47B 81/068 248/676
5,055,977 A * 10/1991 Acquanetta ............ H01H 9/025 362/85
5,125,516 A * 6/1992 McKenna .............. F16M 11/08 211/26.1
5,192,042 A * 3/1993 Wotring ................. H04B 1/202 248/176.1
5,195,634 A * 3/1993 Zaug ...................... H04B 1/202 206/472
5,244,173 A * 9/1993 Kulyk .................... H01H 9/025 248/176.1
5,316,249 A * 5/1994 Anderson .............. H01H 9/025 211/26.1

(Continued)

FOREIGN PATENT DOCUMENTS

GB 2423924 A * 9/2006 ............... A47F 5/05
WO WO-2014147599 A2 * 9/2014 ........... H01H 9/0242

*Primary Examiner* — Patrick D Hawn
(74) *Attorney, Agent, or Firm* — Kenneth L. Tolar

(57) ABSTRACT

A remote-control holder includes one or more elongated trays having a bottom wall, two spaced upstanding sidewalls and an open top in communication with an interior chamber for holding one or more remote units. A restraining strap is positioned across the operating face of the remote unit, between rows of keys, and is secured to a desired position on the tray bottom wall. Multiple trays are securable to a storage rack that allows the remote units to be operated in the stored position.

5 Claims, 9 Drawing Sheets

(56) References Cited

U.S. PATENT DOCUMENTS

| | | | | | |
|---|---|---|---|---|---|
| 5,341,941 | A * | 8/1994 | Marlor | F16M 11/041 | 211/26.1 |
| 5,370,238 | A * | 12/1994 | Czajkowski | H01H 9/025 | 211/26.1 |
| 5,370,241 | A * | 12/1994 | Silvers | H01H 9/025 | 248/176.1 |
| 5,460,347 | A * | 10/1995 | Schacher | H01H 9/025 | 211/26.1 |
| 5,601,194 | A * | 2/1997 | Brinston | H01H 9/025 | 248/176.1 |
| 5,605,235 | A * | 2/1997 | Johnson | F16M 13/00 | 211/26.1 |
| 5,605,312 | A * | 2/1997 | Elder | F16M 13/022 | 248/229.26 |
| 5,692,608 | A * | 12/1997 | Simien | A47C 7/62 | 211/26.1 |
| 5,872,702 | A * | 2/1999 | Kopel | H01H 9/025 | 361/679.01 |
| 5,954,208 | A * | 9/1999 | Schultz | H01H 9/025 | 248/176.1 |
| 6,525,268 | B1 * | 2/2003 | Sellers | A47G 9/1045 | 5/639 |
| 6,769,658 | B2 * | 8/2004 | Stokes | H01H 9/025 | 348/E5.103 |
| 7,044,619 | B2 * | 5/2006 | Sanderlin | F16M 11/28 | 362/253 |
| 7,642,912 | B2 * | 1/2010 | Sholem | H01H 9/025 | 211/26.1 |
| 8,330,638 | B2 * | 12/2012 | Altonen | E06B 9/68 | 341/176 |
| 8,469,204 | B1 * | 6/2013 | Bradshaw | F16M 13/00 | 211/26.1 |
| 10,658,131 | B2 * | 5/2020 | Escurier | H05K 5/023 | |
| 10,843,638 | B2 * | 11/2020 | Erdtmann | H01R 33/97 | |
| 11,125,380 | B2 * | 9/2021 | Hickey | F16B 11/00 | |
| 2005/0155942 | A1 * | 7/2005 | Viola | H01H 9/025 | 211/26.1 |
| 2006/0201895 | A1 * | 9/2006 | Jackson | H01H 9/025 | 211/26.1 |
| 2007/0241929 | A1 * | 10/2007 | Marchetto | H01H 9/0235 | D14/218 |
| 2008/0230498 | A1 * | 9/2008 | Valmore | F16M 13/022 | 211/26.1 |
| 2008/0283479 | A1 * | 11/2008 | Skille | A47G 29/00 | 211/26.1 |
| 2014/0034586 | A1 * | 2/2014 | Eaton | H01H 9/025 | 211/26.1 |

* cited by examiner

REMOTE CONTROL HOLDER

CROSS REFERENCE TO RELATED APPLICATIONS

This application claims priority of provisional application No. 63/048,008 filed on Jul. 3, 2020, the specification of which is incorporated herein by reference.

BACKGROUND OF THE INVENTION

The present invention relates to a device that conveniently retains multiple remote-control units in a single location for easy access.

DESCRIPTION OF THE PRIOR ART

Most consumers have a plurality of audiovisual devices and appliances that are each separately operated with a designated remote control. For example, a typical home entertainment system might include a video player, a television, a satellite or cable TV receiver, a stereo and possibly a surround-sound system. Many of the features of these devices can only be operated with the designated remote unit. However, locating the appropriate remote unit has always been difficult and challenging. The units are often scattered in different locations, under seat cushions, beneath sofas, or in other rooms. Searching for each remote unit anytime a device is used can be time consuming and aggravating. If a user wishes to simultaneously operate multiple devices, locating each designated remote control can be maddening. Wasting time searching for remotes occupies valuable time that could otherwise be used to play a videogame or view a particular movie or event.

Universal remotes have been developed that purportedly operate multiple devices. However, universal remotes are difficult and time consuming to program, and generally do not operate all features of a given device.

Accordingly, there is currently a need for a device that organizes multiple remote units in a single location for easy retrieval when needed. The present invention satisfies that need by providing a holder that can retain various sized remote-control units in an operable orientation.

SUMMARY OF THE INVENTION

The present invention relates to a remote-control holder comprising one or more elongated trays having a bottom wall, two spaced upstanding sidewalls and an open top in communication with an interior chamber for holding one or more remote units. A restraining strap is positioned across the operating face of the remote unit, between rows of keys, and is secured to a desired position on the tray bottom wall. Multiple trays are securable to a storage rack that allows the remote units to be operated in the stored position.

It is therefore an object of the present invention to provide a holder that conveniently retains a plurality of remote units in a single location.

It is therefore another object of the present invention to provide a remote-control holder that allows stored remote units to be operated.

It is yet another object of the present invention to provide a remote-control holder that eliminates the burdensome and aggravating task of searching for multiple remote units.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
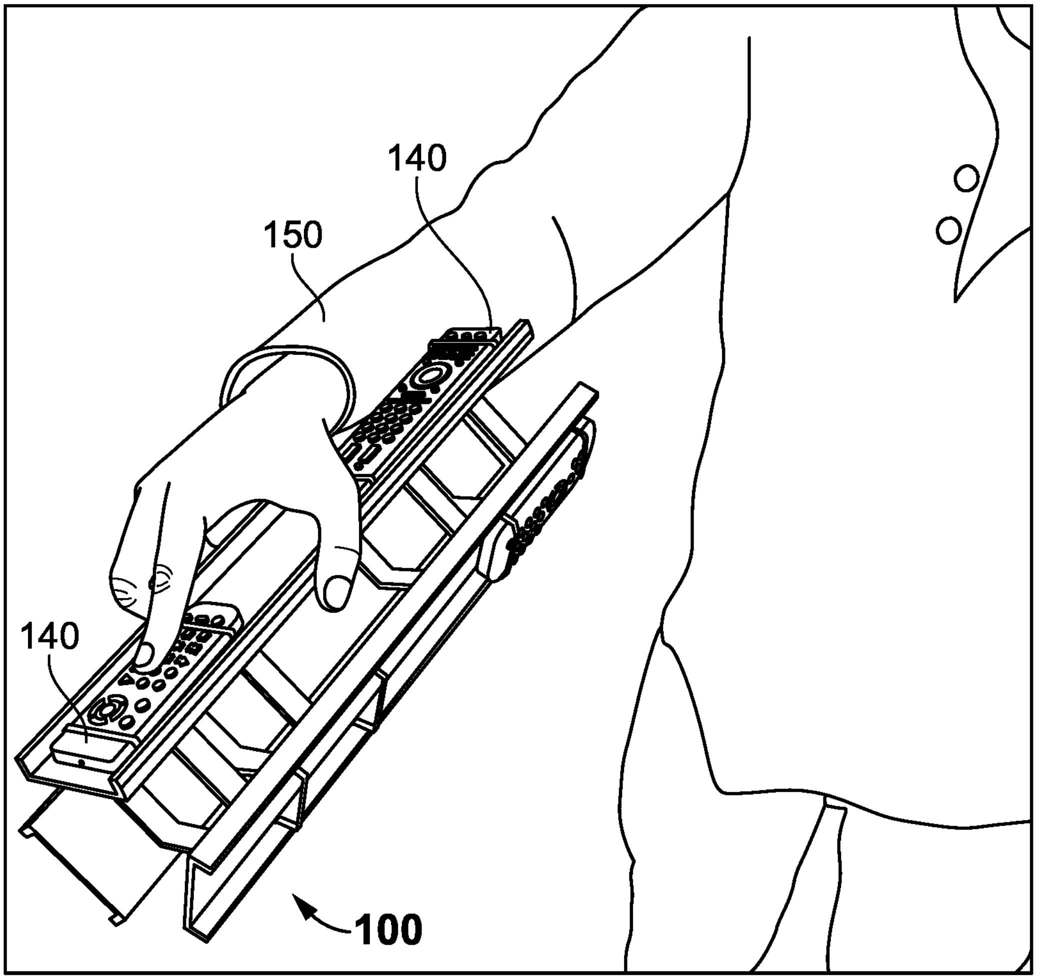
FIG. 1 is a perspective view of a user grasping the support rack and a plurality of holders according to the present invention.
Figure 2:
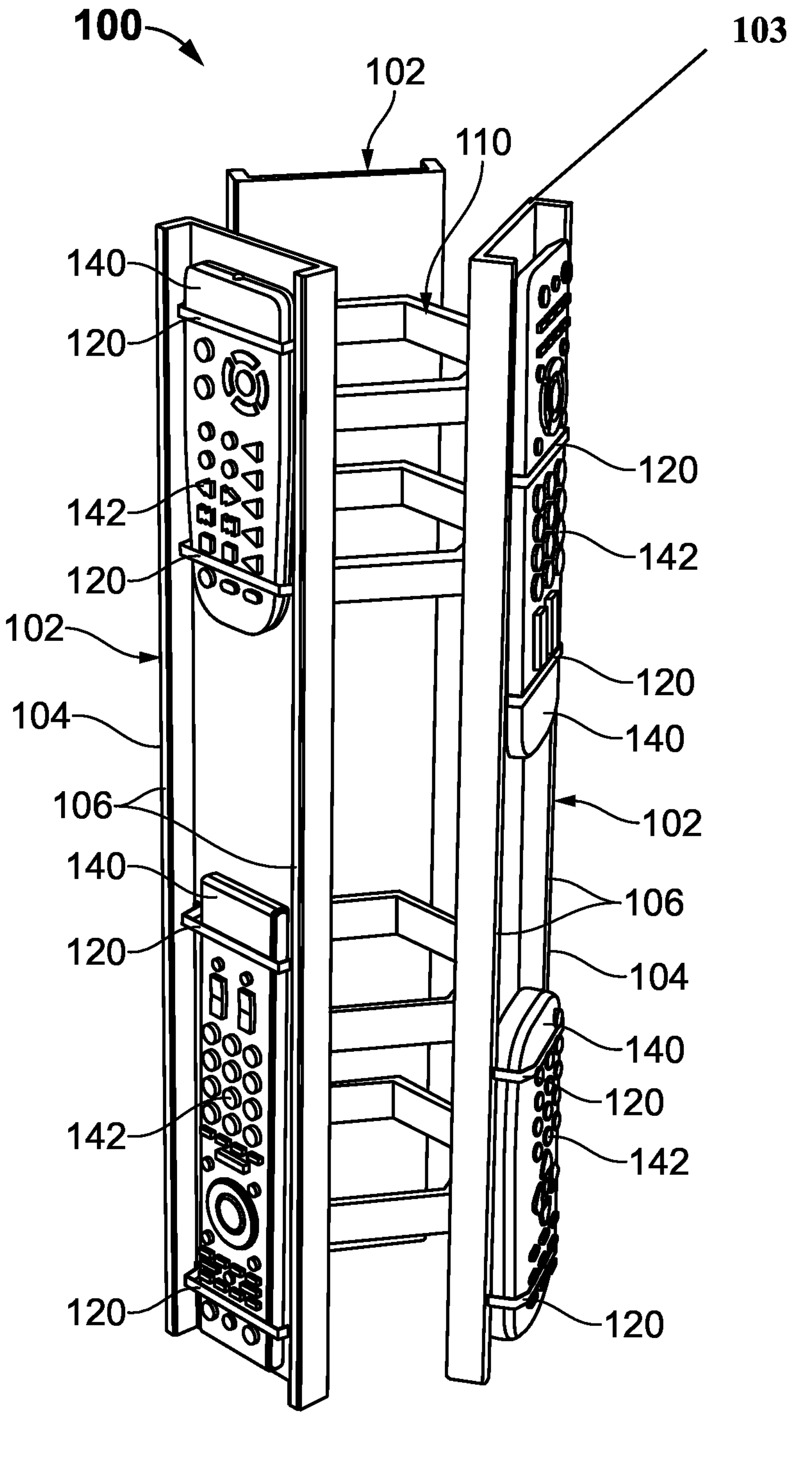
FIG. 2 is a perspective view of the rack with multiple holders secured thereto.
Figure 3:
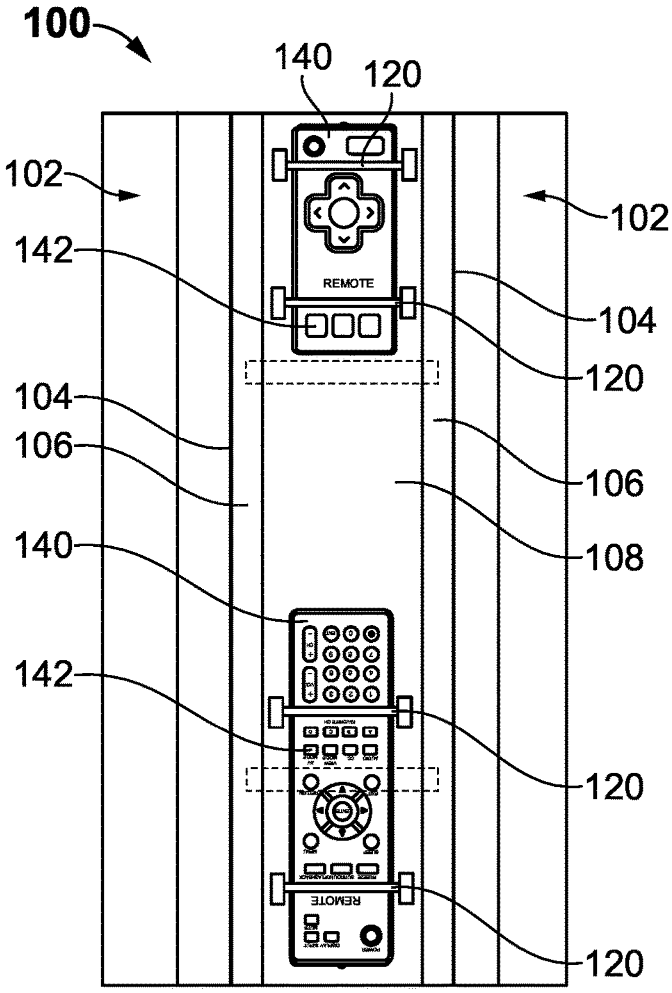
FIG. 3 is a side view of the rack of FIG. 2.
Figure 4:
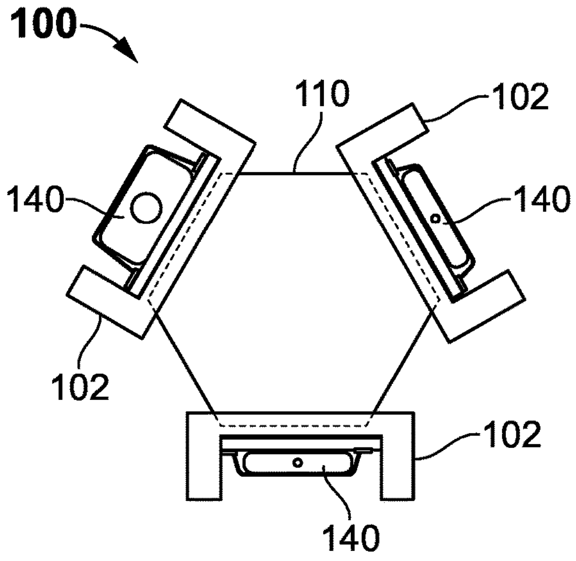
FIG. 4 is a top view of the rack of FIG. 2.
Figure 5:
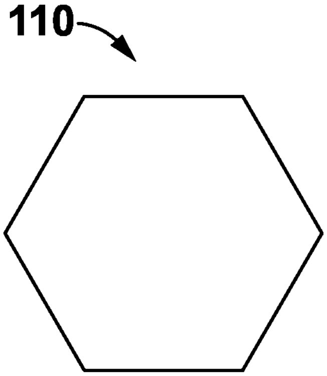
FIG. 5 is a top, isolated view of the rack.

The present invention relates to a remote-control holder 100 comprising one or more elongated trays 102 having a bottom wall 104, two opposing ends 103, two spaced upstanding sidewalls 106 and an open top 107. The space between the spaced sidewalls and bottom wall defines a chamber 108 for holding one or more remote units 140. Preferably, the length of the tray is sufficient to retain at least two remote units lengthwise, end-to-end, with space therebetween. Covering the bottom and sidewalls of the tray is a fabric layer 62 constructed with one of the components of a hook-and-loop fastening system, such as that is commonly marketed and sold under the trademark Velcro™.

The holder further includes an elastomeric restraining strap 120 having a fastener 122 at each of two opposing ends. The fastener 122 is constructed with the mating component of the hook-and-loop fastening system to securely grip the fabric layer 62. The strap 120 can be positioned across the operating face of a remote unit, between rows of keys 142, and secured to a desired position on the fabric layer to restrain the remote unit 140 within the tray chamber 108. Preferably, each remote unit is secured with its infrared projector 144 facing an end 103 of the tray to allow a user to grasp the tray and operate either remote's designated device without removing the remote unit 140. The user simply rotates either end of the tray to point the projector 144 toward the pertinent electronic device.

Figure 6:
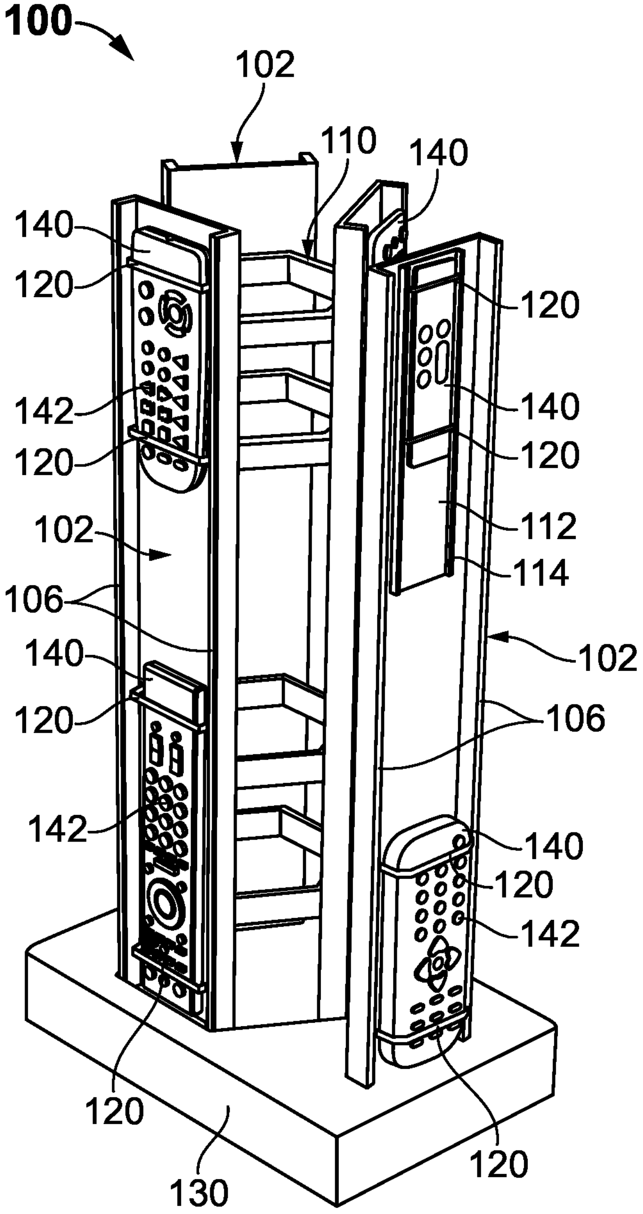
FIG. 6 is a perspective view of the rack mounted on an accompanying base unit.

The holder according to the present invention also includes a rack for retaining multiple trays for increased capacity and convenience. The rack includes a plurality of a tiered, polygonal bands 110, each having a plurality of planar faces for securing to the bottom wall of a support tray. Preferably, the bottom wall of the tray includes a plurality of notches 113 that each removably receive a face on one of a plurality of bands to interconnect a plurality of holders. The support tray could also be attached using any other conventional means, such as adhesives, hook-and-loop fasteners, clips, hooks, etc. As indicated in FIG. 6, a tray could be attached to every other face of multiple hexagonal bands to uprightly secure three remote units in a circular, equally spaced array. Accordingly, a user 150 could insert an arm through the center of the polygonal bands to grasp and operate a select one of the units without removing it. The rack and restrained remote units could be uprightly supported on a base pad 130 when not in use.

Figure 7:
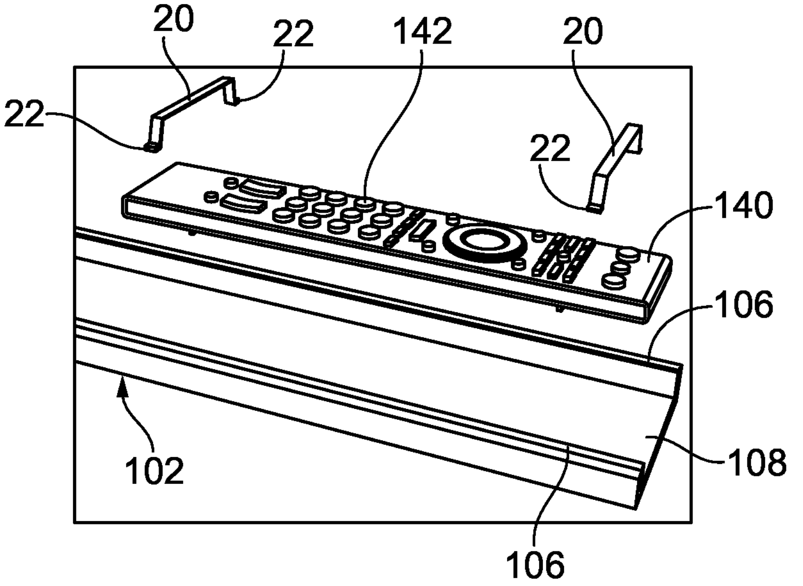
FIG. 7 is an exploded view of an exemplary tray according to a first embodiment of the present invention.
Figure 8:
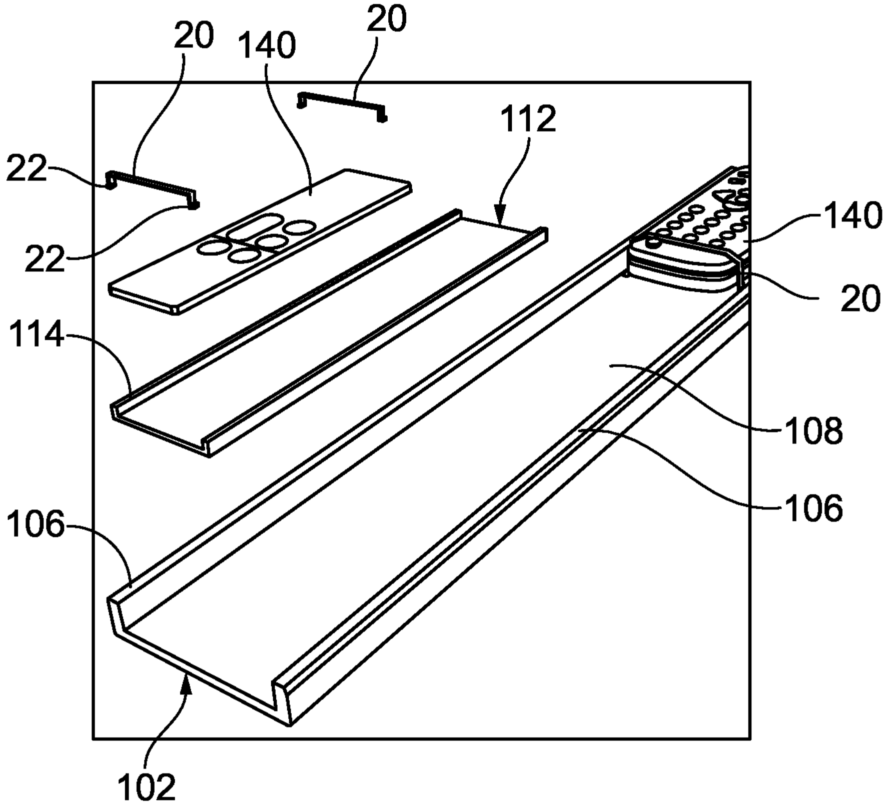
FIG. 8 is an exploded view of an exemplary tray with an adapter for accommodating smaller remote units.
Figure 9:
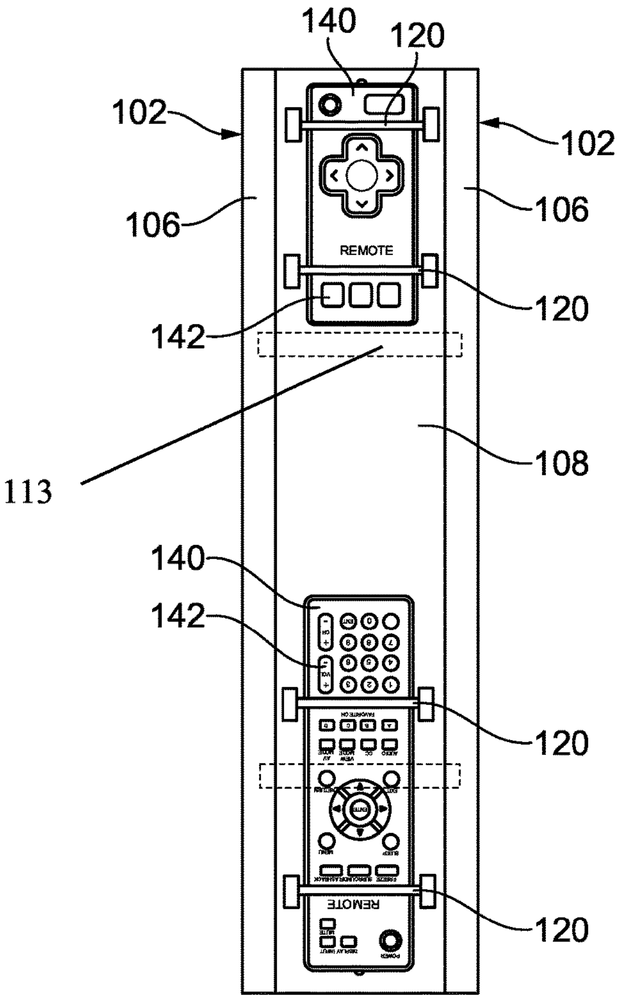
FIG. 9 depicts an exemplary tray retaining multiple remote units.
Figure 10:
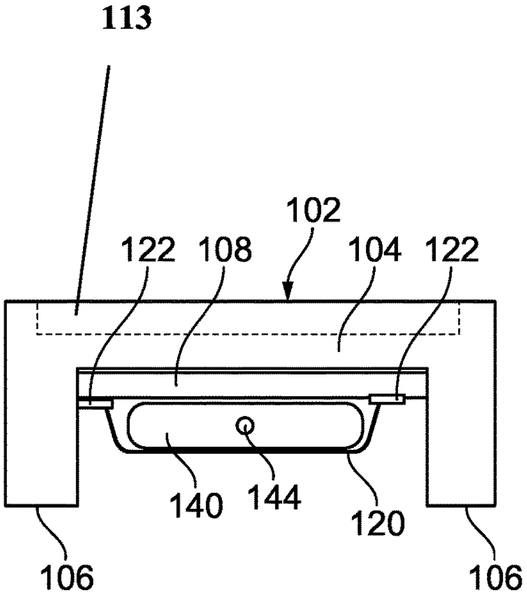
FIG. 10 is an end view of a tray retaining a remote unit.
Figure 11:
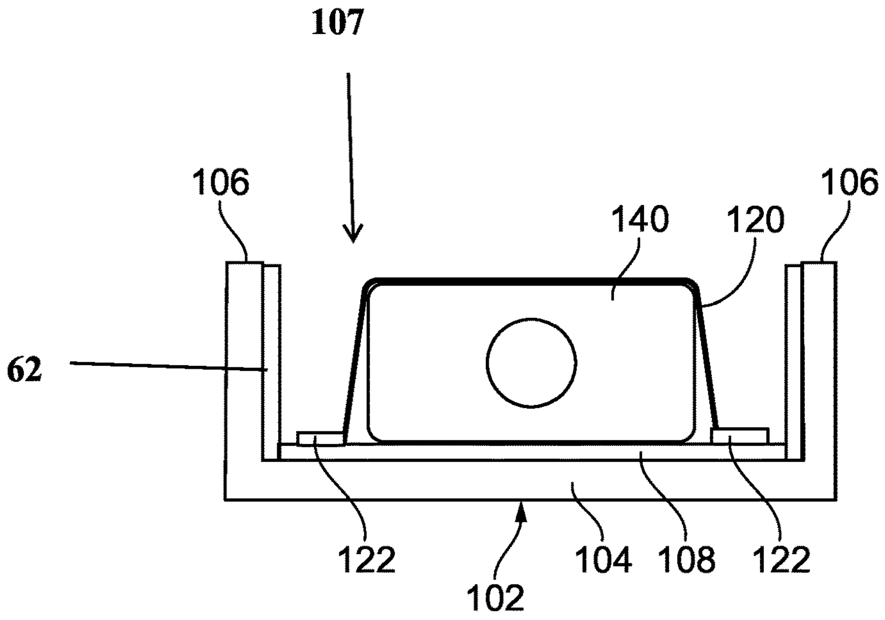
FIG. 11 is an inverted, sectional view of a tray restraining a remote unit.
Figure 12:
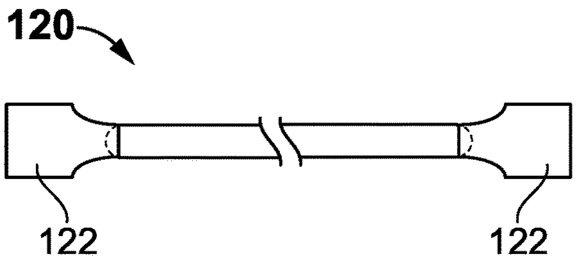
FIG. 12 is an isolated view of a restraining strap.

Now referring specifically to FIGS. 7 and 8, another embodiment includes a rigid band 20 having a tab 22 at each of two opposing ends. The tabs 22 may each include a hook-and-loop fastener on a lower surface for gripping the fabric layer. The holder may also include an adapter 112 that is dimensioned to be firmly received within the chamber 108 to secure smaller remote units 140 within the tray. The adapter 112 includes a pair of upstanding walls 114 for cradling the smaller remote unit.

Figure 13:
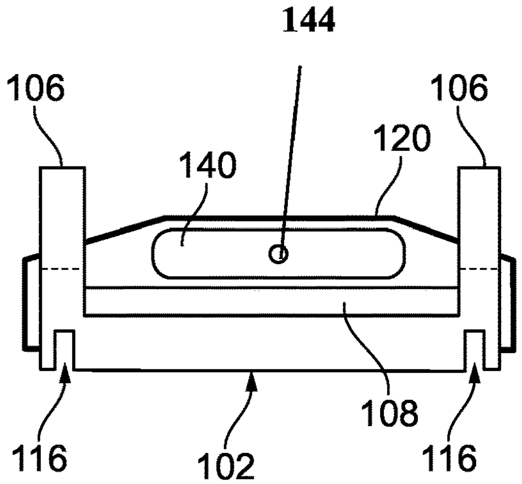
FIG. 13 is an end view of a tray according to another embodiment of the present invention.
Figure 14:
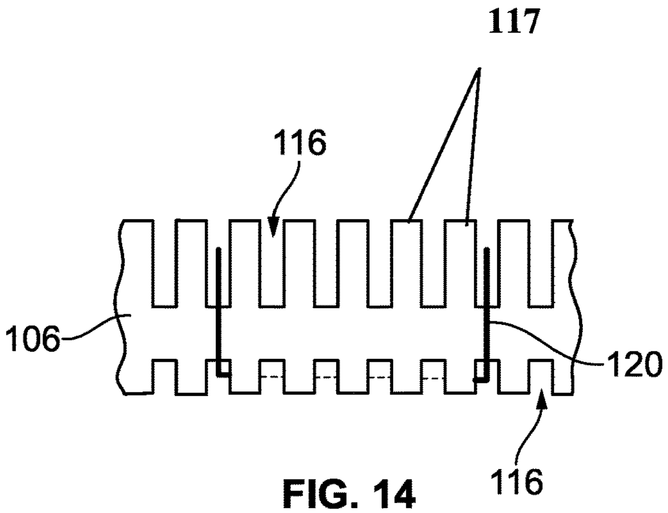
FIG. 14 is a side view of the tray depicted FIG. 13.
Figure 15:
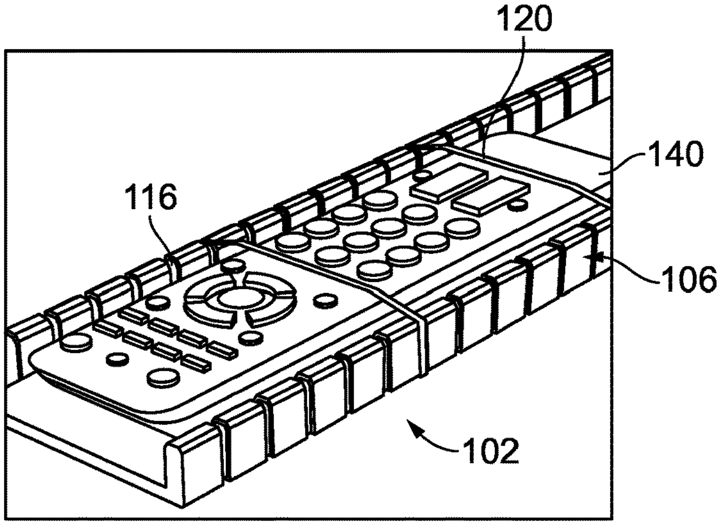
FIG. 15 is a tray according to another embodiment of the present invention.

Now referring to FIGS. 13 and 14, the tray could include a plurality of slots 116 formed by spaced pegs 117 on the sidewalls and the lower wall for receiving a restraining strap 120. The restraining strap could be a conventional rubber band that is wrapped around one or more pegs 117 on one side of the bottom wall, over the top of the remote unit and then around one or more pegs on the opposing side of the bottom wall to secure the remote unit within the tray. The band could be secured over the phone in a variety of patterns and orientations without departing from the scope of the present invention.

Figure 16:
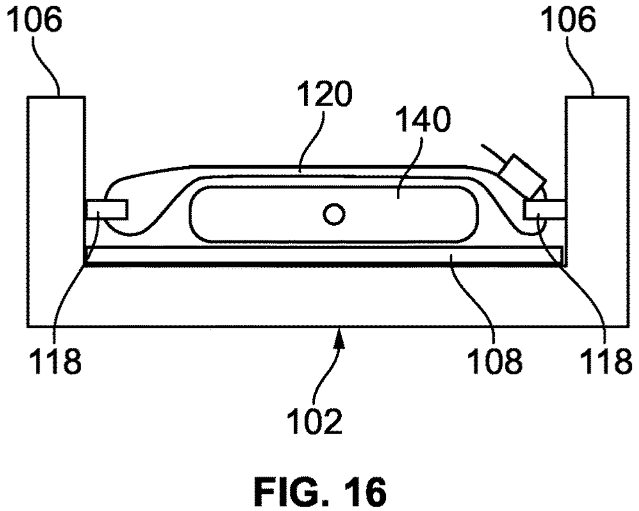
FIG. 16 is a sectional view of a tray according to yet another embodiment of the present invention.
Figure 17:
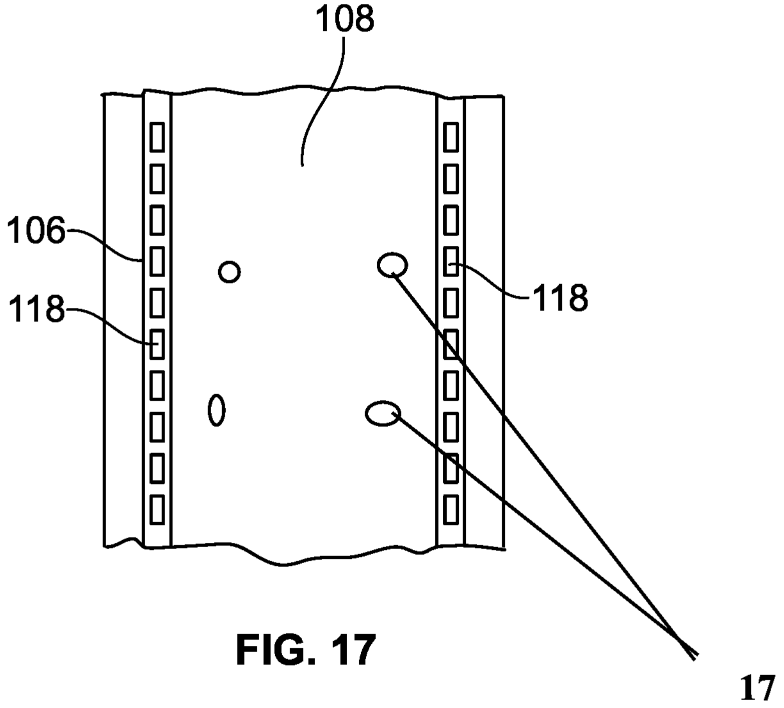
FIG. 17 depicts the sidewall of a tray according to yet another embodiment of the present invention.
Figure 18:
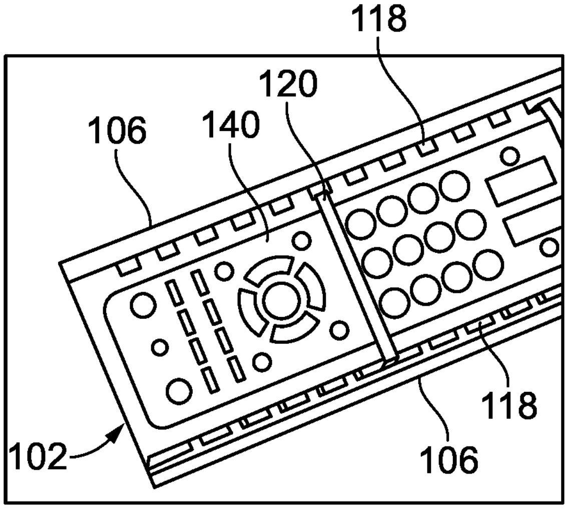
FIG. 18 depicts the tray holding a remote unit in yet another embodiment of the present invention.

FIG. 16 depicts yet another embodiment of the holder wherein the sidewalls include a plurality of slotted bars 118 for receiving a strap, a band, zip ties, or any other restraining member 120. Any of the above-described embodiments may also include varying sized and spaced apertures 17 on the bottom wall for securing zip ties to the tray in lieu of or in addition to the restraining straps. Alternatively, the ends of the restraining straps could have T-connectors at each end that fit within the slots 116 to secure the remote unit 140.

As is readily apparent from the detailed description above, the present invention provides a holder that conveniently retains a myriad of the remote units 140 in a single, easily accessible location. Furthermore, the invention includes a remote unit restraining means that is infinitely positionable in a desired location to prevent interference with keypad operation. Preferably, the trays are constructed with a polycarbonate plastic or a similar lightweight material. However, the above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A remote-control holder comprising:

a tray having a bottom wall, a pair of upstanding sidewalls and an open top in communication with an interior chamber;

a remote-control unit received within said interior chamber;

a strap positioned on said remote control unit and fastened to the bottom wall of said tray;

a plurality of slots formed by spaced pegs on the sidewalls and the lower wall of said tray, said strap wrapped around said remote unit and at least one peg on each of said sidewalls for restraining said remote-control unit within said interior chamber.

2. The remote-control holder according to claim 1 further comprising:

at least one notch on the bottom wall of said tray;

a band having multiple faces, one of said faces received within said notch to interconnect said tray to a second tray.

3. The remote-control holder according to claim 1 further comprising:

an adapter dimensioned to be received within the interior chamber of said tray, said adapter having a pair of upstanding walls for cradling a remote unit.

4. The remote-control holder according to claim 1 wherein said slots are formed by a plurality of slotted bars on said sidewalls for receiving said restraining strap.

5. The remote-control holder according to claim 1 further comprising apertures on the bottom wall of said tray for receiving a tie closure.

* * * * *